US012188640B2

(12) United States Patent
Dai et al.

(10) Patent No.: US 12,188,640 B2
(45) Date of Patent: Jan. 7, 2025

(54) SEPARATED TABLE LAMP

(71) Applicants: SUZHOU OPPLE LIGHTING CO., LTD., Suzhou (CN); OPPLE LIGHTING CO., LTD., Shanghai (CN)

(72) Inventors: Xin Dai, Suzhou (CN); Jianmin Xie, Suzhou (CN)

(73) Assignees: Suzhou Opple Lighting Co., Ltd., Suzhou (CN); Opple Lighting Co., Ltd., Shanghai (CN)

( * ) Notice: Subject to any disclaimer, the term of this patent is extended or adjusted under 35 U.S.C. 154(b) by 0 days.

(21) Appl. No.: 18/437,396

(22) Filed: Feb. 9, 2024

(65) Prior Publication Data

US 2024/0247788 A1 Jul. 25, 2024

Related U.S. Application Data

(63) Continuation of application No. PCT/US2022/110005, filed on Aug. 3, 2022.

(30) Foreign Application Priority Data

Aug. 9, 2021 (CN) ......................... 202121841104.7

(51) Int. Cl.
*F21V 21/26* (2006.01)
*F21S 6/00* (2006.01)
(Continued)

(52) U.S. Cl.
CPC .............. *F21V 21/26* (2013.01); *F21S 6/003* (2013.01); *F21V 17/12* (2013.01); *F21V 23/06* (2013.01)

(58) Field of Classification Search
CPC .......... F21V 21/06; F21V 21/14; F21V 21/26; F21V 21/28; F21V 21/29; F21S 6/003
See application file for complete search history.

(56) References Cited

U.S. PATENT DOCUMENTS 6,592,241 B1 * 7/2003 Kovacik ............... F21V 21/096 362/427
2008/0062687 A1 3/2008 Behar et al.
(Continued)

FOREIGN PATENT DOCUMENTS

CN 203453889 U 2/2014
CN 107062169 A 8/2017
(Continued)

OTHER PUBLICATIONS

International Search Report of PCT/CN2022/110005 dated Oct. 26, 2022 with English translation, (5p).

*Primary Examiner* — Robert J May
(74) *Attorney, Agent, or Firm* — Arch & Lake LLP

(57) ABSTRACT

A separated table lamp, comprising: a base, a first electrical connection portion being arranged on the base, and an electronic control module electrically connected to the first electrical connection portion being arranged inside the base; a lamp head comprising a light source assembly; and a foldable bracket, one end of the foldable bracket being rotatably connected to the lamp head, and the other end of the foldable bracket being detachably connected to the base. The foldable bracket is internally provided with a cable channel for a cable to pass through, a second electrical connection portion is arranged on the end of the foldable bracket connected to the base, one end of the cable is electrically connected to the light source assembly, and the other end of the cable is electrically connected to the second electrical connection portion.

9 Claims, 6 Drawing Sheets

(51) Int. Cl.
*F21V 17/12* (2006.01)
*F21V 23/06* (2006.01)

(56) References Cited

U.S. PATENT DOCUMENTS

| | | | | | |
|---|---|---|---|---|---|
| 2010/0315801 | A1* | 12/2010 | Wu | F21S 6/003 | 362/257 |
| 2011/0051437 | A1* | 3/2011 | Ng | F21S 6/003 | 362/418 |
| 2013/0329431 | A1* | 12/2013 | Lin | F21S 6/003 | 362/253 |
| 2017/0332460 | A1 | 11/2017 | Sato | | |
| 2019/0239314 | A1 | 8/2019 | Sato | | |
| 2019/0239315 | A1 | 8/2019 | Sato | | |

FOREIGN PATENT DOCUMENTS

| | | | |
|---|---|---|---|
| CN | 107113953 | A | 8/2017 |
| CN | 107504389 | A | 12/2017 |
| CN | 109000191 | A | 12/2018 |
| CN | 209012871 | U | 6/2019 |
| CN | 215908910 | U | 2/2022 |

* cited by examiner

SEPARATED TABLE LAMP

CROSS REFERENCES TO RELATED APPLICATIONS

This application is based upon and claims the priority of PCT patent application No. PCT/CN2022/110005 filed on Aug. 3, 2022 which claims priority to the Chinese patent application No. 202121841104.7 filed on Aug. 9, 2021, the entire contents of which are hereby incorporated by reference herein for all purposes.

TECHNICAL FIELD

The disclosure relates to the technical field of lighting, in particular to a separated table lamp.

BACKGROUND

Table lamps are small, exquisite and easy to carry, and are widely used in home lighting, mainly for reading, working and studying. A table lamp usually includes a base, a bracket, a cable, and a lamp head.

SUMMARY

The present disclosure is to provide a separated table lamp.

The disclosure provides a separated table lamp that may includes:

a base, a first electrical connection portion being arranged on the base, and an electronic control module electrically connected to the first electrical connection portion being arranged inside the base;

a lamp head, including a light source assembly;

a foldable bracket, one end of the foldable bracket being rotatably connected to the lamp head, and the other end of the foldable bracket being detachably connected to the base;

the foldable bracket is internally provided with a cable channel for a cable to pass through, and the end of the foldable bracket connected to the base is provided with a second electrical connection portion, one end of the cable is electrically connected to the light source assembly, and the other end of the cable is electrically connected to the second electrical connection portion, and the foldable bracket is configured to have an unfolded use state and a folded storage state, in the unfolded use state, the foldable bracket is connected to the base and the first electrical connection portion is in conductive contact with the second electrical connection portion, and in the folded storage state, the foldable bracket is separated from the base and the first electrical connection portion is decoupled from the second electrical connection portion.

It is to be understood that both the foregoing general description and the following detailed description are exemplary and explanatory only and are not restrictive of the present disclosure.

DETAILED DESCRIPTION

Figure 1:
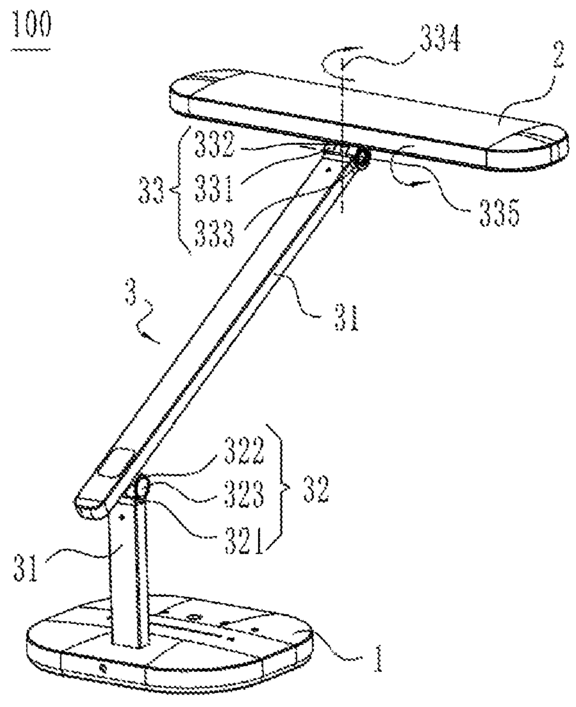
FIG. 1 is a three-dimensional schematic diagram of an unfolded use state according to an example of the present disclosure.

It is easy to understand that, according to the technical solution of the present disclosure, those skilled in the art can propose multiple structural modes and implementation modes that can be replaced without changing the essential spirit of the present disclosure. Therefore, the following examples and drawings are only exemplary descriptions of the technical solution of the present disclosure, and should not be regarded as the entirety of the present disclosure or as a limitation or restriction on the technical solution of the present disclosure.

The azimuth terms such as up, down, top, bottom, inside, outside, between and vertical mentioned in this specification are defined relative to the structures shown in the drawings, and they are relative concepts, so they may change accordingly according to their different positions and different use states. Therefore, these or other directional terms should not be interpreted as restrictive terms.

The reference signs used in this disclosure may include:

100. separated table lamp;

1. base; 11. upper shell; 12. lower shell; 13. support plate; 14. first electrical connection portion; 15. electronic control module; 16. slot; 161. through hole; 17. screw; 18. concave portion; 19. cover plate;

2. lamp head; 21. light source assembly;

3. foldable bracket; 31. connecting rod; 311. insertion portion; 312. threaded hole; 32. first rotating connector; 321. first rotating joint; 322. second rotating joint; 323. first damping rotation shaft; 33. second rotating connector; 331. third rotating joint; 332. fourth rotating joint; 333. second damping rotation shaft; 334. center line; 335. axis line; 34. cable channel; 35. cable; 36. second electrical connection portion; 37. installation groove; 38. fixing piece;

41. storage groove; 42. anti-slip portion.

There is an electronic control module in the base of table lamps. Electronic control modules may include plug-in or battery-type electronic control modules. Plug-in table lamps can be used by plugging in, while battery-type table lamps can usually be used only after storing electricity. There is light source assembly, such as LED light-emitting elements, in the lamp head. The bracket may be connected between the base and the lamp head to support the lamp head. One end of the cable may be electrically connected with the electric control module in the base, and the other end of the cable may be electrically connected with the light source assembly in the lamp head. The bracket of some table lamps may be a foldable bracket or a flexible metal tube, so that the use position of the lamp head can be adjusted. For table lamps with foldable brackets, the cables between the lamp head and the lamp base may be exposed, and the appearance may not be beautiful enough, and the exposed cables may be prone to leakage hazards, causing unnecessary safety hazards to users. The cables of table lamps with flexible metal tube may be arranged inside the flexible metal tube, and the cables are hidden, which has beautiful appearance. However, the current table lamp may be designed in one piece, and the base, bracket and lamp head may be fixedly connected and cannot be disassembled, which may occupy a large packaging volume during transportation, and has high transportation cost.

Figure 2:
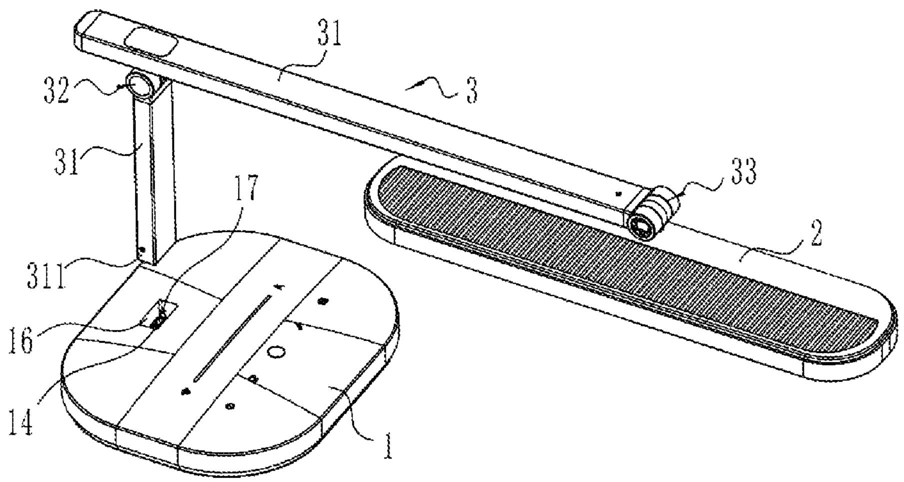
FIG. 2 is a three-dimensional schematic diagram of separation of a base and a foldable bracket according to an example of the present disclosure.

As shown in FIG. 1 and FIG. 2, a separated table lamp 100 includes a base 1, a lamp head 2 and a foldable bracket 3. The foldable bracket 3 is rotatably connected with the lamp head 2, and the other end is detachably connected with the base 1.

Figure 4:
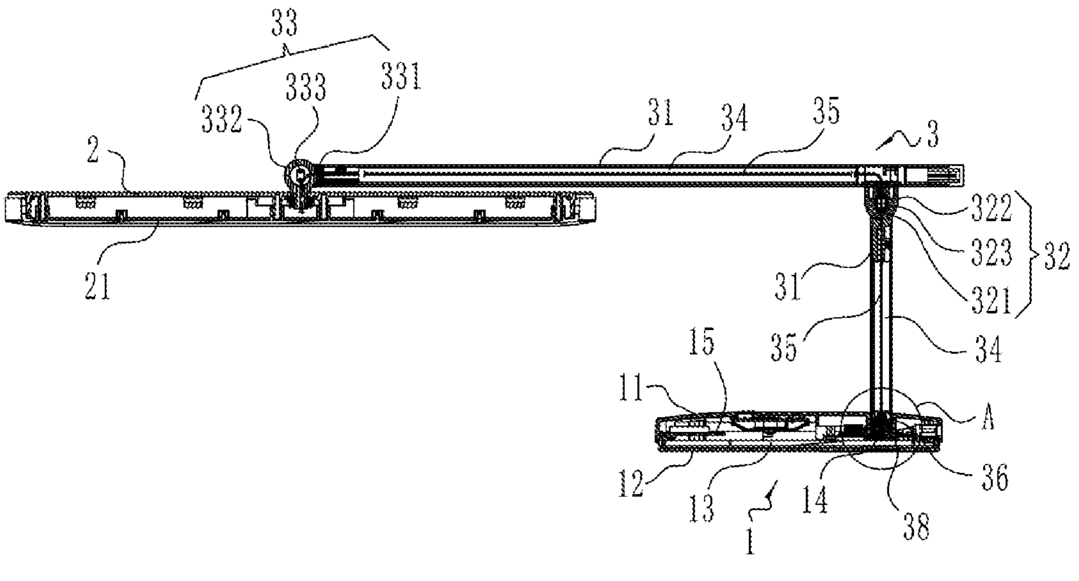
FIG. 4 is a schematic cross-sectional structure according to an example of the present disclosure.
Figure 5:
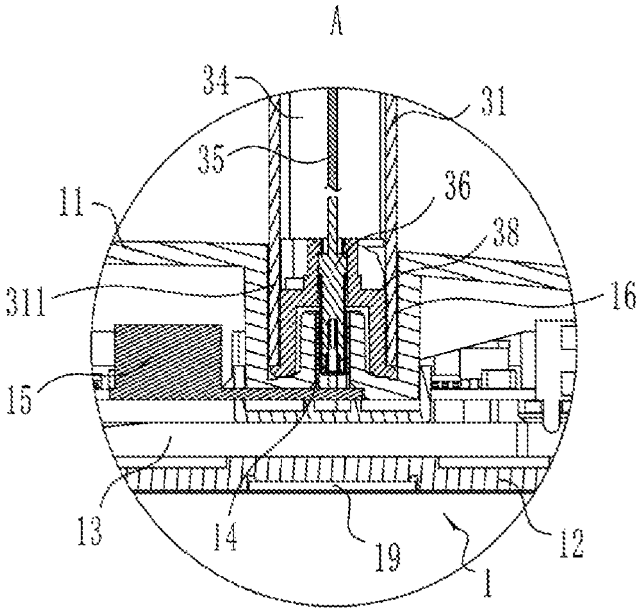
FIG. 5 is a partially enlarged schematic diagram of place A in FIG. 4.
Figure 6:
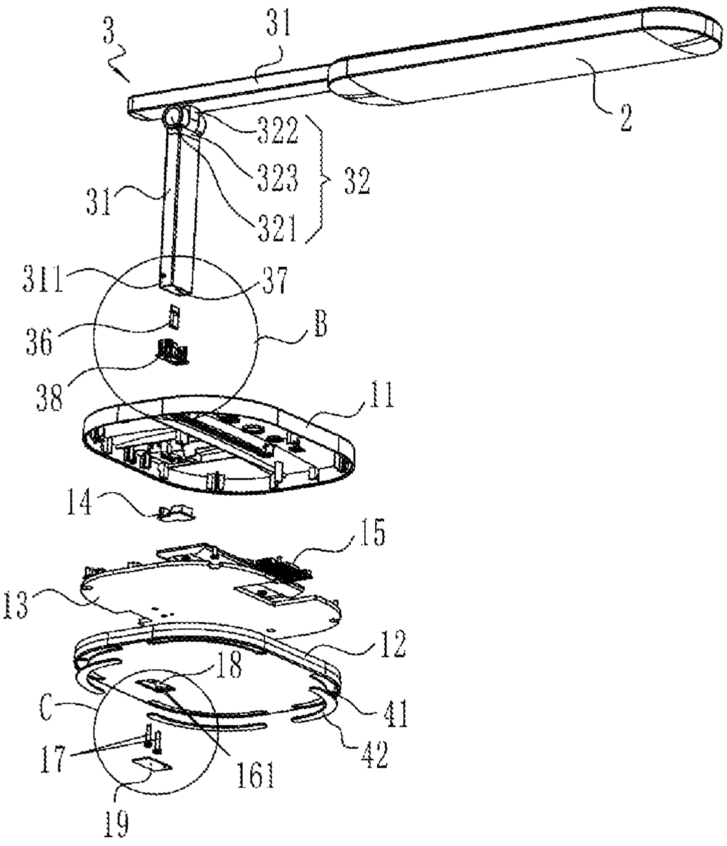
FIG. 6 is a schematic diagram of an explosion structure according to an example of the present disclosure.

As shown in FIG. 4 to FIG. 6, the base 1 includes an upper shell 11, a lower shell 12 and a support plate 13, the upper shell 11 and the lower shell 12 are detachably connected and the upper shell and the lower shell enclose a closed accommodation space, the base 1 is provided with a first electrical connection portion 14, and an electronic control module 15 electrically connected with the first electrical connection portion 14 is provided inside. The support plate 13 is arranged in the accommodation space, and the electronic control module 15 is installed on the support plate 13. The electronic control module 15 can be a plug-in type electronic control board, which can be connected to the commercial power through an external plug. Alternatively, the electronic control module can also be a battery-storage module, which can include a battery, etc., and the battery can supply power to the table lamp after the battery is stored. A light source assembly 21 is disposed inside the lamp head 2, in which the light source assembly 21 may be an LED lamp board.

Figure 8:
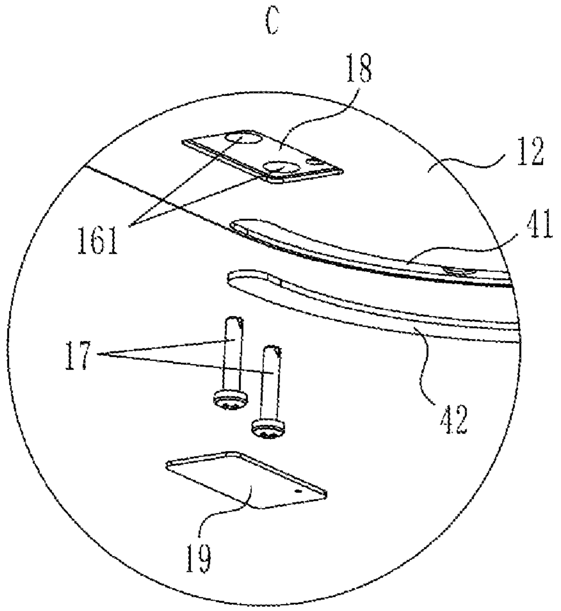
FIG. 8 is a partially enlarged schematic diagram of place C in FIG. 6.

As shown in FIG. 8, in order to prevent the table lamp from sliding and fading when placed on a smooth surface, for example, when the table lamp is placed on a smooth desktop, some anti-slip portions 42 are provided on the bottom surface of the base 1. The anti-slip portion 42 may be an anti-slip rubber strip. The bottom surface of the base 1 is provided with some storage grooves 41, in which the storage grooves 41 are adapted to the shape and size of the anti-slip portion 42 and accommodate the anti-slip portion 42, and the outer surface of the anti-slip portion 42 is flush with the bottom surface of the base 1, or protrude from the bottom surface of the base 1.

As shown in FIG. 4 and FIG. 5, the foldable bracket 3 is internally provided with a cable channel 34 for a cable 35 to pass through. The end of the foldable bracket 3 connected to the base 1 is provided with a second electrical connection portion 36, and one end of the cable 35 is electrically connected to the light source assembly 21, and the other end of the cable is electrically connected to the second electrical connection portion 36. In this example, the first electrical connection portion 14 is a type-C interface, and the second electrical connection portion 36 is a type-C connector. Of course, in other examples, the connection structures of the two electrical connection portions are not limited to type-C, and may also be other USB interface types, conductive sheets, electrical terminals, and the like. Because the cable 35 is arranged inside the foldable bracket 3 and no wiring is designed outside the table lamp, the overall appearance of the table lamp is more beautiful.

As shown in FIG. 1, the foldable bracket 3 includes some connecting rods 31, some first rotating connectors 32 and second rotating connectors 33, and two adjacent connecting rods 31 are connected through the first rotating connector 32, and the connecting rod 31 and the lamp head 2 are connected through the second rotating connector 33. In this example, the foldable bracket 3 includes two connecting rods 31, one first rotating connector 32 and one second rotating connector 33. In other examples, in order to adjust the position and angle of the lamp head of the table lamp, the foldable bracket 3 may include more connecting rods 31 and more first rotating connectors 32.

The first rotating connector 32 includes a first rotating joint 321, a second rotating joint 322 and a first damping rotation shaft 323, one of the two adjacent connecting rods 31 is fixedly connected to the first rotating joint 321, and the other is fixedly connected to the second rotating joint 322, and the first damping rotation shaft 323 is set between the first rotating joint 321 and the second rotating joint 322.

The second rotating connector 33 includes a third rotating joint 331, a fourth rotating joint 332 and a second damping rotation shaft 333. The connecting rod 31 of the foldable bracket 3 connecting the lamp head 2 is fixed to the third rotating joint 331, and the lamp head 2 is rotatably connected to the fourth rotating joint 332, the second damping rotation shaft 333 is disposed between the third rotating joint 331 and the fourth rotating joint 332, and a center line 334 of the fourth rotating joint 332 is approximately perpendicular to an axis line 335 of the damping rotation shaft. The connection between the rotating joint and the connecting rod can be detachable, such as plug-in, threaded connection and snap connection; the connection can also be non-detachable connection, such as welding, riveting or adhesive connection. The words “first, second, third and fourth” only play the role of distinguishing between technical features with similar functions, and do not constitute a restriction on the order.

Figure 3:
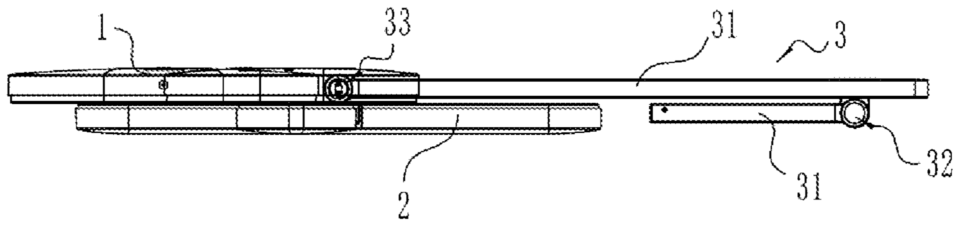
FIG. 3 is a structural schematic diagram of a folded storage state according to an example of the present disclosure.

As shown in FIGS. 1 to 3, the foldable bracket 3 is configured to have an unfolded use state and a folded storage state, in the unfolded use state, the foldable bracket 3 is connected to the base 1 and the first electrical connection portion 14 is in conductive contact with the second electrical connection portion 36, and in the folded storage state, the foldable bracket 3 is separated from the base 1 and the first electrical connection portion 14 is decoupled from the second electrical connection portion 36. In actual production, the space occupied by the table lamp in the folded storage state can be reduced to ¼ of the space occupied in the unfolded use state. This separated structural design can effectively reduce the packaging volume of the table lamp and facilitate transportation.

In order to make the connection between the foldable bracket 3 and the base 1 more reliable and to ensure stable electrical contact between the first electrical connection portion 14 and the second electrical connection portion 36, the foldable bracket 3 and the base 1 may be screwed.

Specifically, as shown in FIG. 2, FIG. 5, and FIG. 6, the base 1 is provided with a slot 16, and the end of the foldable bracket 3 connected to the base 1 forms an insertion portion 311 matched with the slot 16, the slot 16 is provided with a through hole 161 passing through the base 1, and a bottom of the insertion portion 311 is provided with a threaded hole 312, the foldable bracket 3 is configured such that: in the unfolded use state, the insertion portion 311 is assembled in the slot 16, and is connected by a screw 17 through the through hole 161 and screwed with the threaded hole 312.

Certainly, in other examples, the connection between the foldable bracket 3 and the base 1 may also be other detachable connection methods, such as snap connection.

Figure 7:
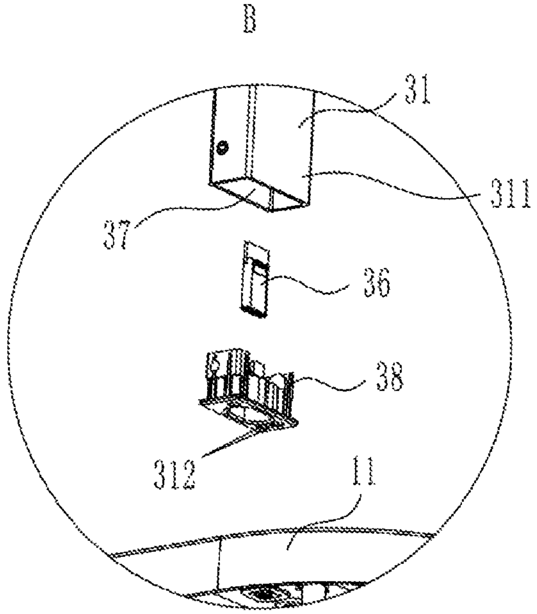
FIG. 7 is a partially enlarged schematic diagram of place B in FIG. 6.

As shown in FIG. 7, in order to protect the second electrical connection portion 36 and prevent the second electrical connection portion 36 from being exposed outside the foldable bracket 3 and being easily damaged by other external forces, the end of the foldable bracket 3 connected to the base 1 is provided with an installation groove 37, and the second electrical connection portion 36 is assembled in the installation groove 37 by a fixing piece 38. The fixing piece 38 forms a bottom of the insertion portion 311, and a threaded hole 312 is opened in the fixing piece 38.

As shown in FIG. 8, in order to make the bottom surface of the base 1 smoother and the appearance of the base 1 more beautiful, the bottom surface of the base 1 is provided with a concave portion 18 for accommodating the screw 17, and a cover plate 19 for closing the concave portion 18 is disposed on the concave portion 18.

The purpose of the present disclosure is to provide a separated table lamp that can reduce the packaging volume for easy transportation and has a simple and beautiful appearance.

For this reason, the disclosure provides a kind of separated table lamp, includes:

a base, a first electrical connection portion being arranged on the base, and an electronic control module electrically connected to the first electrical connection portion being arranged inside the base;

a lamp head, including a light source assembly;

a foldable bracket, one end of the foldable bracket being rotatably connected to the lamp head, and the other end of the foldable bracket being detachably connected to the base;

the foldable bracket is internally provided with a cable channel for a cable to pass through, and the end of the foldable bracket connected to the base is provided with a second electrical connection portion, one end of the cable is electrically connected to the light source assembly, and the other end of the cable is electrically connected to the second electrical connection portion, and the foldable bracket is configured to have an unfolded use state and a folded storage state, in the unfolded use state, the foldable bracket is connected to the base and the first electrical connection portion is in conductive contact with the second electrical connection portion, and in the folded storage state, the foldable bracket is separated from the base and the first electrical connection portion is decoupled from the second electrical connection portion.

Preferably, the foldable bracket is screwed to the base.

Preferably, the base is provided with a slot, and the end of the foldable bracket connected to the base forms an insertion portion matched with the slot, the slot is provided with a through hole passing through the base, and a bottom of the insertion portion is provided with a threaded hole, the foldable bracket is configured such that: in the unfolded use state, the insertion portion is assembled in the slot, and a screw passes through the through hole and is screwed with the threaded hole.

Preferably, a bottom surface of the base is provided with a concave portion for accommodating the screw, and a cover plate for closing the concave portion is disposed on the concave portion.

Preferably, the first electrical connection portion is a type-C interface, and the second electrical connection portion is a type-C connector.

Preferably, the end of the foldable bracket connected to the base is provided with an installation groove, and the second electrical connection portion is assembled in the installation groove by a fixing piece.

Preferably, the foldable bracket comprises some connecting rods, some first rotating connectors and a second rotating connector, two adjacent connecting rods are connected through the first rotating connector, and the connecting rod and the lamp head are connected through the second rotating connector.

Preferably, the first rotating connector includes a first rotating joint, a second rotating joint and a first damping rotation shaft, one of the two adjacent connecting rods is fixedly connected to the first rotating joint, the other of the two adjacent connecting rods is fixedly connected to the second rotating joint, and the first damping rotation shaft is set between the first rotating joint and the second rotating joint.

Preferably, the second rotating connector includes a third rotating joint, a fourth rotating joint and a second damping rotation shaft, the connecting rod of the foldable bracket connecting to the lamp head is fixed to the third rotating joint, and the lamp head is rotatably connected to the fourth rotating joint, the second damping rotation shaft is disposed between the third rotating joint and the fourth rotating joint, and a center line of the fourth rotating joint is approximately perpendicular to an axis line of the second damping rotation shaft.

Preferably, the base includes an upper shell, a lower shell and a support plate, and the upper shell and the lower shell are detachably connected and both of the upper shell and the lower shell enclose a closed accommodation space, the support plate is disposed in the accommodation space, and the electronic control module is installed on the support plate.

Compared with other implementations, the beneficial effects of the present disclosure are as follows:

1. The foldable bracket has the unfolded use state in which the foldable bracket is connected to the base and the two electrical connection portions are in conductive contact, and the folded storage state in which the base is separated from the foldable bracket and the two electrical connection portions are powered off. In the folded storage state, the packing volume of the table lamp can be reduced, which is convenient for transportation.
2. A cable channel is set inside the foldable bracket, so that one end of the cable is electrically connected to the light source assembly in the lamp head, and the other end is electrically connected to the second electrical connection portion on the end of the foldable bracket, so that the appearance of the table lamp is more concise and beautiful.

The present disclosure may include dedicated hardware implementations such as application specific integrated circuits, programmable logic arrays and other hardware devices. The hardware implementations can be constructed to implement one or more of the methods described herein. Examples that may include the apparatus and systems of various implementations can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the system disclosed may encompass software, firmware, and hardware implementations. The terms “module,” “sub-module,” “circuit,” “sub-circuit,” “circuitry,” “sub-circuitry,” “unit,” or “sub-unit” may include memory (shared, dedicated, or group) that stores code or instructions that can be executed by one or more processors. The module refers herein may include one or more circuit with or without stored code or instructions. The module or circuit may include one or more components that are connected.

The technical scope of the present application is not limited to the content in the above description. Those skilled in the art can make various deformations and modifications to the above examples without departing from the technical idea of the present application, and these deformations and modifications should belong to the within the protection scope of this application.

The invention claimed is:

1. A separated table lamp, comprising:

a base, a first electrical connection portion being arranged on the base, and an electronic control module electrically connected to the first electrical connection portion being arranged inside the base;

a lamp head, comprising a light source assembly;

a foldable bracket, one end of the foldable bracket being rotatably connected to the lamp head, and the other end of the foldable bracket being detachably connected to the base; and wherein the foldable bracket is internally provided with a cable channel for a cable to pass through, and the end of the foldable bracket connected to the base is provided with a second electrical connection portion, one end of the cable is electrically connected to the light source assembly, and the other end of the cable is electrically connected to the second electrical connection portion, and the foldable bracket is configured to have an unfolded use state and a folded storage state, in the unfolded use state, the foldable bracket is connected to the base and the first electrical connection portion is in conductive contact with the second electrical connection portion, and in the folded storage state, the foldable bracket is separated from the base and the first electrical connection portion is decoupled from the second electrical connection portion;

wherein the base is provided with a slot, the end of the foldable bracket connected to the base forms an insertion portion matched with the slot, and the insertion portion of the foldable bracket is screwed to the slot of the base.

2. The separated table lamp according to claim 1, wherein the slot is provided with a through hole passing through the base, and a bottom of the insertion portion is provided with a threaded hole, the foldable bracket is configured such that: in the unfolded use state, the insertion portion is assembled in the slot, and a screw passes through the through hole and is screwed with the threaded hole.

3. The separated table lamp according to claim 2, wherein a bottom surface of the base is provided with a concave portion for accommodating the screw, and a cover plate for closing the concave portion is disposed on the concave portion.

4. The separated table lamp according to claim 1, wherein the first electrical connection portion is a type-C interface, and the second electrical connection portion is a type-C connector.

5. The separated table lamp according to claim 1, wherein the end of the foldable bracket connected to the base is provided with an installation groove, and the second electrical connection portion is assembled in the installation groove by a fixing piece.

6. The separated table lamp according to claim 1, wherein the foldable bracket comprises connecting rods, a first rotating connector and a second rotating connector, two adjacent connecting rods are connected through the first rotating connector, and the connecting rod and the lamp head are connected through the second rotating connector.

7. The separated table lamp according to claim 6, wherein the first rotating connector comprises a first rotating joint, a second rotating joint and a first damping rotation shaft, one of the two adjacent connecting rods is fixedly connected to the first rotating joint, the other of the two adjacent connecting rods is fixedly connected to the second rotating joint, and the first damping rotation shaft is set between the first rotating joint and the second rotating joint.

8. The separated table lamp according to claim 6, wherein the second rotating connector comprises a third rotating joint, a fourth rotating joint and a second damping rotation shaft, the connecting rod of the foldable bracket connecting to the lamp head is fixed to the third rotating joint, and the lamp head is rotatably connected to the fourth rotating joint, the second damping rotation shaft is disposed between the third rotating joint and the fourth rotating joint, and a center line of the fourth rotating joint is approximately perpendicular to an axis line of the second damping rotation shaft.

9. The separated table lamp according to claim 1, wherein the base comprises an upper shell, a lower shell and a support plate, and the upper shell and the lower shell are detachably connected and both of the upper shell and the lower shell enclose a closed accommodation space, the support plate is disposed in the accommodation space, and the electronic control module is installed on the support plate.

* * * * *